S. P. P. Miller,
Basket,
No. 77,516.    Patented May 5, 1868.
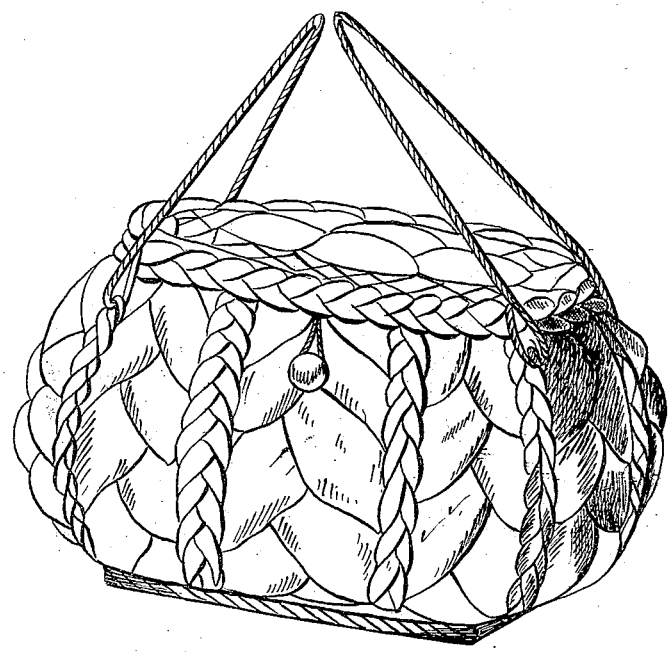
Witnesses.
W. C. Ashkettle
Wm A Morgan
Inventor.
S. P. P. Miller.
per Munn & Co.
Attorneys.

United States Patent Office.

SARAH P. P. MILLER, OF BEAVER, PENNSYLVANIA.

Letters Patent No. 77,516, dated May 5, 1868.

IMPROVED BASKET.

*The Schedule referred to in these Letters Patent and making part of the same.*

TO ALL WHOM IT MAY CONCERN:

Be it known that I, SARAH P. P. MILLER, of Beaver, in the county of Beaver, and State of Pennsylvania, have invented a new and improved Cloth Water-Proof Basket; and I do hereby declare that the following is a full, clear, and exact description thereof, which will enable those skilled in the art to make and use the same, reference being had to the accompanying drawings, forming part of this specification.

This invention relates to a new and useful improvement in the material used and in the method of forming or manufacturing baskets for various purposes; and it consists in constructing the same of strips of cloth or "paper rags," braided or twisted together, shaped, painted, and varnished, as will be hereinafter described.

The drawing represents a basket formed according to my invention.

The cloth is torn or cut into strips, as for making carpet, or it may be in any form so that the pieces can be braided or twisted together. The braids or strands are sewed together in any form suitable for the desired shape of the basket.

After being thus sewed, the basket is stuffed with rags, moss, or any other material suitable for the purpose, to exactly the desired shape.

The outside is then sized with any suitable stiffening-substance, so that it will make the basket stiff enough to retain its shape after the stuffing is removed.

After the stuffing is removed, the inside is stiffened in the same manner with the sizing, when the basket is thoroughly dried.

The basket is then painted inside and outside with any suitable oil-paint, and of any desired color, after which it is varnished with coach-varnish, or other varnish suited to the purpose.

A basket made in this manner is both water-proof and durable, and as the principal materials are found in every household, the baskets may be produced at comparatively slight cost.

Having thus described my invention, I claim as new, and desire to secure by Letters Patent—

As a new article of manufacture, a cloth basket, made of strips of cloth braided or twisted together, and coated with varnish or sizing inside and out, to preserve the form and render it water-proof, substantially as described.

SARAH P. P. MILLER.

Witnesses:
    JOS. C. WILSON,
    J. C. McKENZIE.